United States Patent [19]

Layman et al.

[11] 4,088,921
[45] * May 9, 1978

[54] ZINC SULFIDE PHOSPHOR COACTIVATED WITH COPPER AND ALUMINUM

[75] Inventors: H. David Layman, Ulster; Henry B. Minner, Dushore, both of Pa.

[73] Assignee: GTE Sylvania Incorporated, Stamford, Conn.

[*] Notice: The portion of the term of this patent subsequent to Jul. 26, 1994, has been disclaimed.

[21] Appl. No.: 696,876

[22] Filed: Jun. 17, 1976

Related U.S. Application Data

[62] Division of Ser. No. 509,928, Sep. 27, 1974, abandoned.

[51] Int. Cl.² .................. H01J 29/20; H01J 31/20
[52] U.S. Cl. ................................ 313/467; 313/470
[58] Field of Search ........................... 313/471, 467

[56] References Cited

U.S. PATENT DOCUMENTS

| | | | |
|---|---|---|---|
| 2,623,858 | 12/1952 | Kroger | 252/301.6 S |
| 2,743,240 | 4/1956 | Froelich | 252/301.6 S |
| 3,595,804 | 7/1971 | Martin | 252/301.6 S |

OTHER PUBLICATIONS

"Optical Characteristics of Cathode Ray Tube Screens," JEDEO publication no. 16-B; p. 16 cited.

Primary Examiner—Robert Segal
Attorney, Agent, or Firm—John C. Fox

[57] ABSTRACT

A green emitting ZnS: Cu, Al cathodoluminescent phosphor having $x$ and $y$ coordinate values of from 0.250 to 0.280 and 0.560 to 0.615 respectively, is produced by a critical firing schedule exemplified by slow heating to about 1000° C, soaking at this temperature for about 1 hour, followed by slow cooling at about 3° C per minute to 700° C, followed by air quenching. The phosphor is useful for example, in tri-color television color television cathode ray tubes.

3 Claims, 6 Drawing Figures

ZINC SULFIDE PHOSPHOR COACTIVATED WITH COPPER AND ALUMINUM

CROSS REFERENCE TO RELATED APPLICATION

This application is a division of Ser. No. 509,928, filed Sept. 27, 1974, now abandoned, and assigned to the assignee of the present invention. Assignment recorded Sept. 27, 1974, Reel 3124 Frame 963.

BACKGROUND OF THE INVENTION

This invention relates to cadmium-free greem emitting cathodoluminescent phosphors, and more particularly relates to ZnS: Cu, Al phosphors having higher color purity than prior green emitting ZnS-based and ZnCdS-based phosphors, and to a method for producing them and devices including them.

A standard green phosphor used widely in the production of cathode ray tubes for color television is a ZnCdS coactivated with Cu and Al. While the presence of cadmium in these phosphors is known to have certain beneficial effects, for example, the amount of cadmium may be adjusted to vary $x$ and $y$ coordinate values with a permissible range, nevertheless its cost and certain handling precautions could lead eventually to the use of cadmium-free cathode ray tube phosphors. Furthermore phosphors containing cadmium tend to exhibit yellow body color and shifts in body color during processing, so-called "bake-shifts."

While ZnS: Cu, Al phosphors having green cathodoluminescent emissions have been known for sometime, (see for example U.S. Pat. No. 2,623,858 to Kröger on Dec. 30, 1952), such phosphors are characterized by low brightness levels and by the presence of significant blue emissions, resulting in low purity of the green emissions. Such characteristics render these phosphors unsuitable for use in conventional tri-dot color cathode ray tubes.

SUMMARY OF THE INVENTION

In accordance with the invention, it has been discovered that both purity (by the substantial suppression of blue emissions) and brightness of ZnS: Cu, Al phosphors may be substantially improved by forming such phosphors in accordance with a critical processing schedule carried out in a nonoxidizing atmosphere and preferably in the presence of elemental carbon, the process exemplified by slow heating to a soak temperature of about 1000° C, slow cooling to about 700° C, followed by rapid cooling at a rate of at least about 50° C per minute. The resulting phosphor is characterized by cathodoluminescent emissions having $x$ and $y$ coordinate values within the range of 0.250 to 0.280 and 0.560 to 0.6150 respectively, and is useful, for example, as the green component in a tri-color cathode ray tube as employed in television and allied display applications.

As used herein the terms $x$ and $y$ coordinate values refer to values on a standard chromaticity diagram as defined by CIE (Commission Internationale de l'Elairage) as determined for tri-color television shadow mask cathode ray tubes incorporating the phosphor.

DETAILED DESCRIPTION OF THE INVENTION

Figure 1:
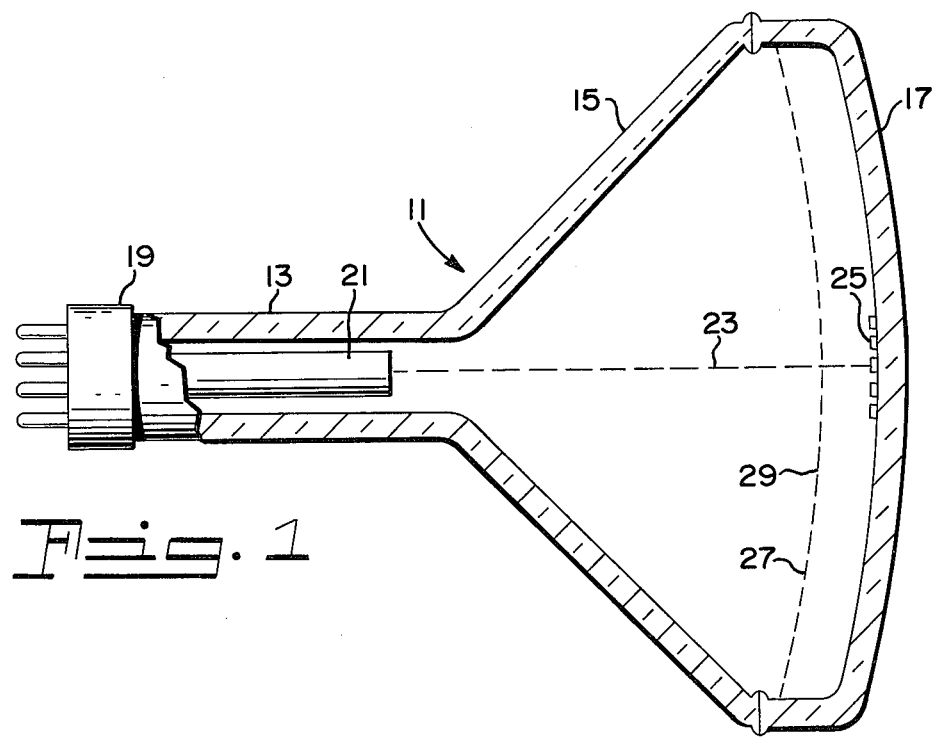
FIG. 1 is a front elevational view partly in section of a shadow mask cathode ray tube commonly used in color television receiving apparatus.

The chemical composition of the phosphor of the invention is essentially zinc sulfide containing less than about 50 parts per million of halogen, and containing copper and aluminum coactivators in the amounts of from 10 to 200 parts per million and 20 to 600 parts per million respectively, and preferably within the range of 50 to 150 parts per million of copper and 100 to 400 parts per million of aluminum, in order to achieve the desired green emissions.

A preferred method of preparing the phosphor includes mixing powders of zinc sulfide of the required purity with powders of copper and aluminum coactivators as the nitrate compounds respectively, placing this crucible inside a larger crucible, filling the space between the crucibles with activated carbon, covering at least the outside crucible to exclude ambient oxygen, and heat treating.

For the successful practice of the invention, heat treating must be carried out in accordance with the critical schedule to be described.

While the rate at which the phosphor mixture is brought to the firing temperature is not particularly critical, extremely rapid heating rates are to be avoided in that they may lessen brightness of the phosphor. For example, for a furnace having a heating rate within the range of about 3° to 10° C per minute, a phosphor may be inserted into the furnace at any temperature from room temperature up to about 800° C. Inserting the phosphor above 800° C however, would result in the phosphor being brought to the firing temperature at such a rapid rate as to cause reduced brightness.

The phosphor is fired at a temperature of from about 950° to 1010° C for about 1 minute to about 2 hours. Firing outside this temperature range or for extended periods of time in general results in lowered brightness of the phosphor. A firing time of from about 15 minutes to about 1 hour is preferred.

The rate of cooling the phosphor from the firing temperature has been found to be critical to the obtaining of the desired $x$ and $y$ coordinate values and brightness values. Cooling should take place at a rate of from about 2° C per minute up to about 30° C per minute down to a temperature of from about 760° C to about 870° C. Cooling too fast to a temperature within this range results in lower brightness while cooling too slow within this range results in undesirable shifts in $x$ and $y$ coordinates into the blue emission range. In addition, carrying out slow cooling to a temperature above 870° C or below 760° C results in shifts in $x$ and $y$ coordinate values into the blue emission range. Further cooling below this temperature range should be at a more rapid rate, that is, at least about 50° C per minute and preferably at as fast a rate as possible, down to a temperature of at least about 40° C. It has been found that an air quench provides a suitably rapid cooling rate and is convenient to carry out, simply by removing the sample from the furnace. The non-oxidizing atmosphere which is critical during firing need be no longer maintained below the temperature of about 100° C, below which the dangers from oxidation are substantially minimal.

EXAMPLE I

A series of four phosphor samples of zinc sulfide containing less than 50 parts per million halogen and containing 100 parts per million cooper and 240 parts per million aluminum were prepared by weighing and mixing well powders. Each mixture was then placed in a crucible which was in turn placed inside a larger crucible. The space between these crucibles was filled with activated carbon, and both crucibles were covered to exclude ambient oxygen. The assemblies were then placed in a furnace, fired for about 1 hour at 1000° C, and cooled. The particular heating and cooling conditions were varied as detailed below for the four phosphor samples. They were then given a 10% acidic acid wash for about 10 minutes and then given 3 successive hot water washes. They were then dried at 100° C for about 6 to 8 hours, followed by screening through a 325 mesh screen. The cathodoluminescent emission spectrums of these phosphors were then analyzed by spectroradiometer. The resulting emission spectrums, plotted as brightness in arbitrary units versus wavelength in manometers, are shown in FIGS. 3 through 6.

Figure 3:
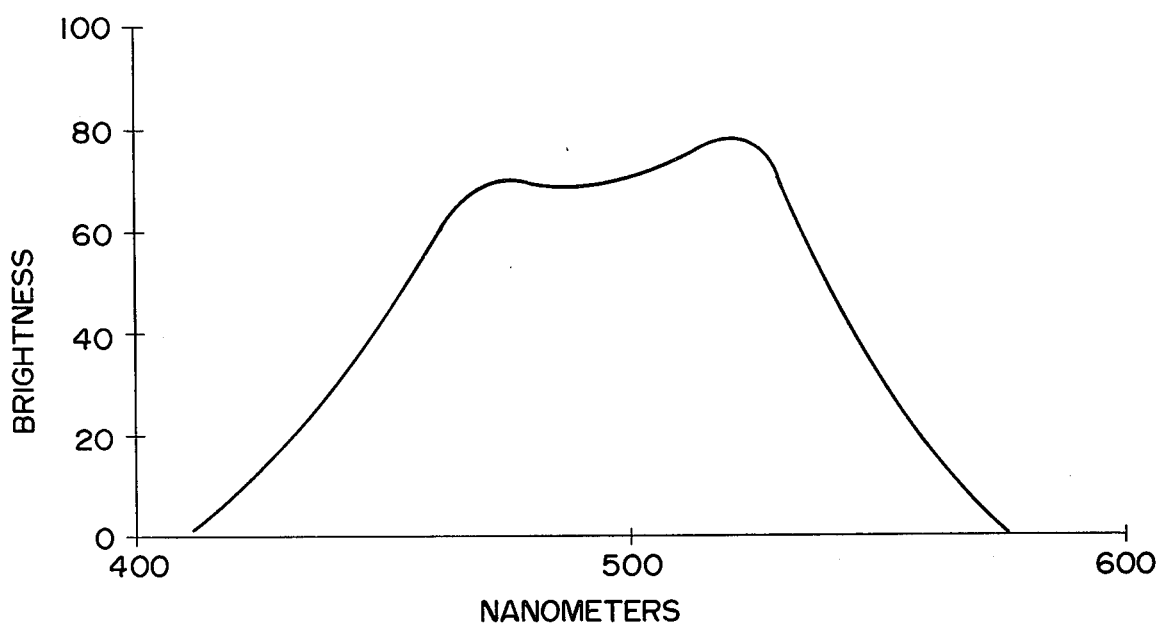
FIGS. 3, 4, 5 and 6 are graphs of cathodoluminescent emission spectra of a ZnS: Cu, Al phosphor subjected to four different processing schedules.
Figure 4:
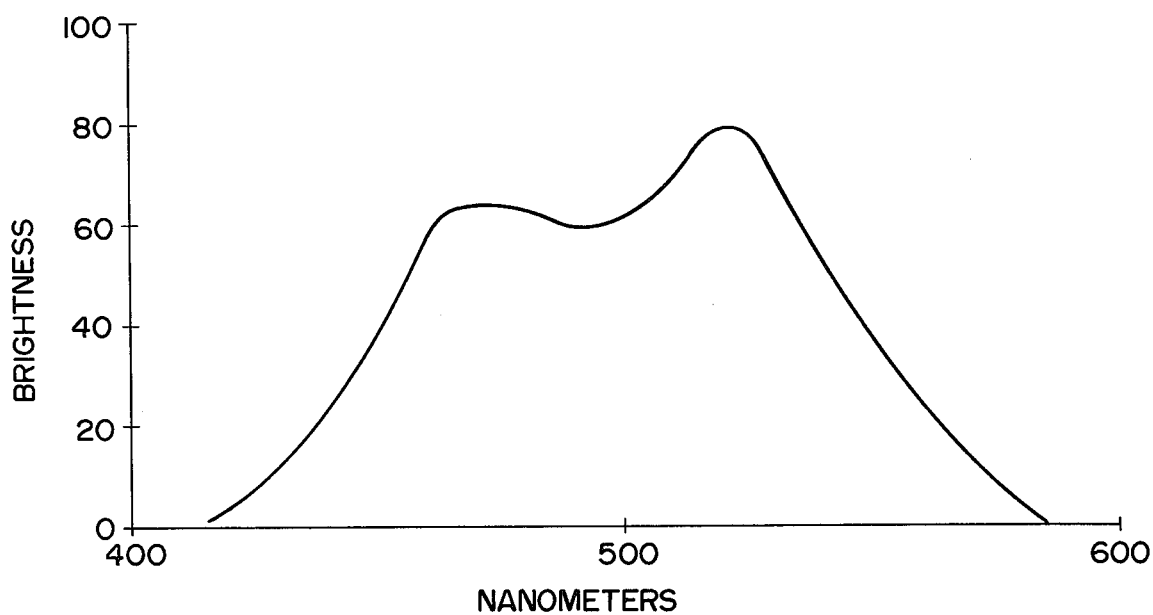
Figure 5:
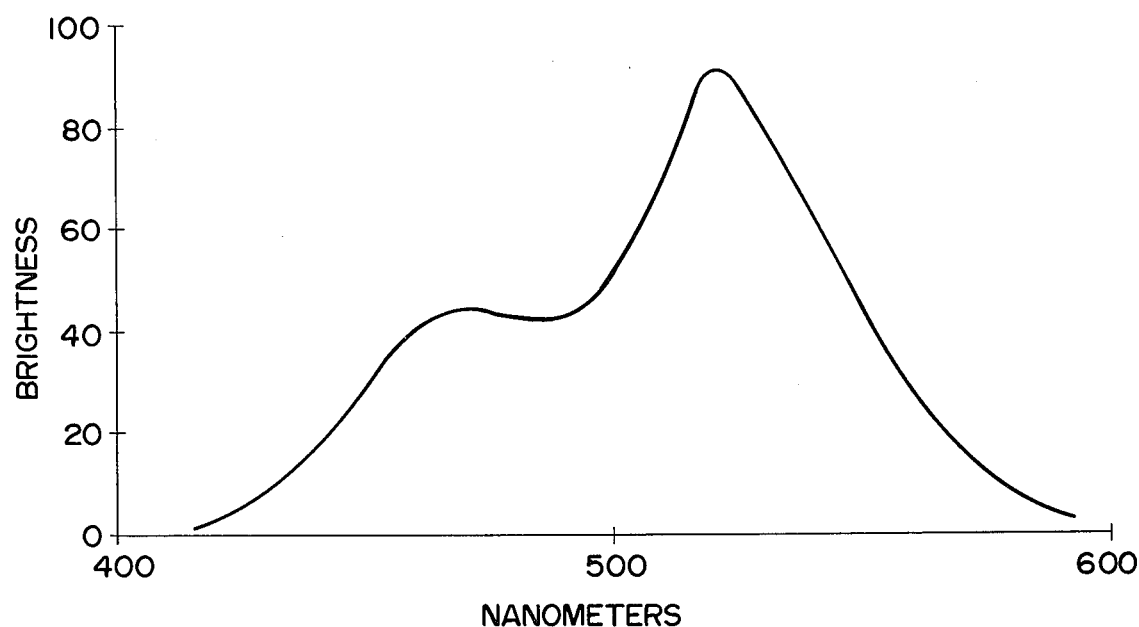
Figure 6:
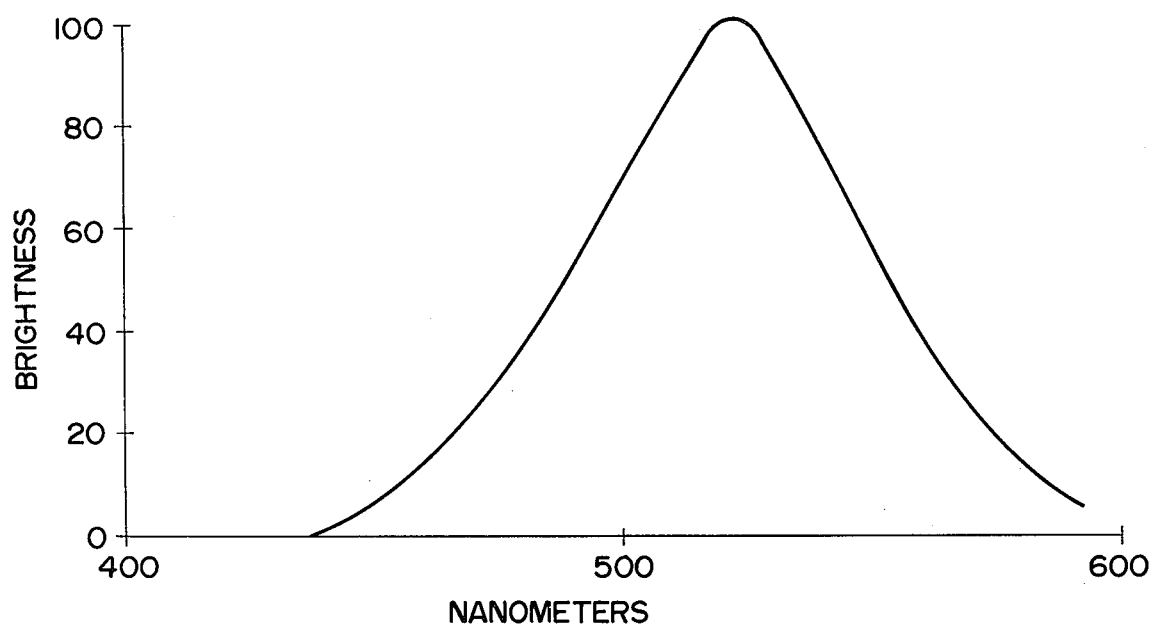

The emission spectrum shown in FIG. 3 was generated for the first phosphor sample which was cooled at the rate of 10° C per minute from 1000° to about 910° C and thereafter cooled at a rate of about 3° C per minute down to a temperature of about 427° C, and thereafter air quenched. As may be seen from the figure, emissions peaking at about 475 nanometers have significant intensities, indicating that significant blue emissions are present in the spectrum. The spectrum of FIG. 4 was obtained for the second phosphor sample which was air quenched from the firing temperature of about 1000° C down to room temperature. Again the significant blue emissions in the spectrum are evident. The spectrum of FIG. 5 was obtained for third phosphor sample which was inserted into the furnace at the firing temperature of about 1000° C and thus subjected to a very fast heating rate. Again as may be seen from the figure significant blue emissions are present in the spectrum. The emission spectrum of FIG. 6 was obtained for the fourth phosphor sample which was cooled at the rate of about 10° C per minute from about 1000° C to about 910° C and thereafter cooled at the rate of about 3° C per minute down to a temperature of about 700° C and thereafter air quenched. As may be seen from the figure, significant blue emissions are substantially absent from this spectrum and the processing schedule to which this phosphor was subjected represents a preferred embodiment of the process of the invention.

The phosphor of the invention may be disposed upon the screen of a cathode ray tube such as is shown in FIG. 1 and commonly in use in television receiving apparatus. It is desired to discretely dispose discrete patterns, for example, tri-dot depositions in a manner whereby the subsequent electron beam impingements will be in register therewith and have the largest possible minimum border of fluorescent material around each beam impinging position. Prior to the exposure of each of the several patterns comprising the screen, the screen bearing surface is coated with a light hardenable photosensitive substance and a desired electron responsive color cathodoluminescent phosphor material, to form a photosensitive phosphor associated film thereover. Next, discrete areas of the coated panel are subjected to light from a light source passing through an apertured mask positioned in spaced relation with the sensitized panel to impinge upon the photosensitive film. The exposed areas of the photosensitive film become hardened and adhere to the surface of the glass panel. The unexposed portions of the film are then removed by treating the panel with a suitable solvent or developing fluid for the film. This procedure is repeated for each color of the tri-dot tube combination.

Referring now to FIG. 1 in detail, the tube comprises an envelope 11 having a neck portion 13, a funnel portion 15, and a face panel 17. A tube base 19 is attached to the neck portion 13 to provide means for connecting the tube electrodes with their associated receiver circuitry. Within the neck 13 there is mounted an electron gun or guns 21 which provide the electron beam or beams 23 utilized in the operation of the tube. A color screen 25 having the usual configurations of color emitting phosphors is formed on the internal surface of face panel 17 as described above. Positioned adjacent to screen 25, but substantially spaced therefrom, is a mask or grid 27 having therein a plurality apertures 29. The type of tube illustrated in FIG. 1 may use grid 27 primarily to either focus or deflect beam 23, or to mask, or to mask and focus the electron beam to attain proper electron impingement upon color screen 25. The specific grid and screen structures and the potentials on the grid and screen will determine the type of operation in a manner known in the art.

Figure 2:
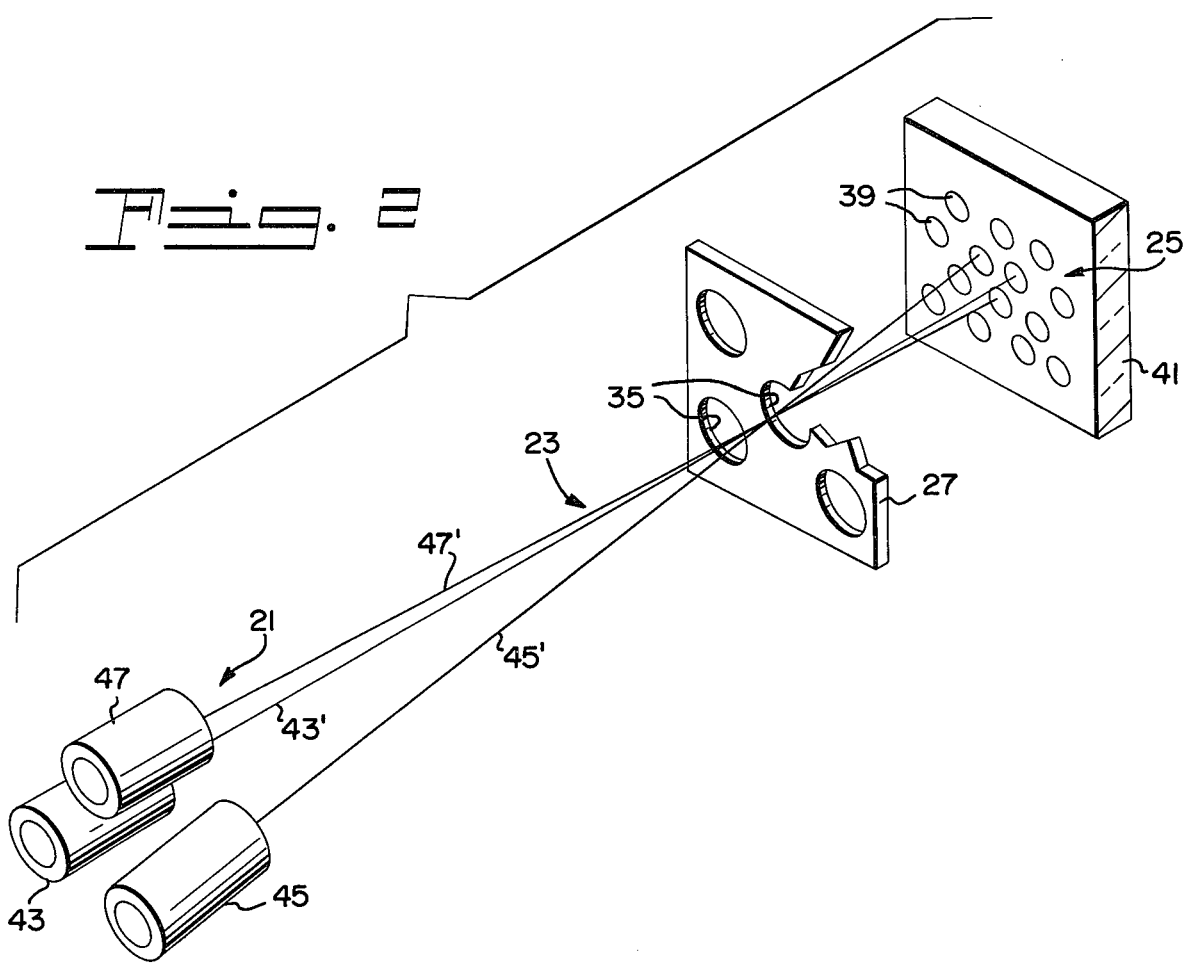
FIG. 2 is a schematic representation in greater detail of a specific form of screen and grid structure for the tube of FIG. 1.

There is shown in FIG. 2 in greater detail one specific form of a screen and grid structure having internal portions of a tri gun shadow mask tube employing a dot pattern of tri-color phosphor groups in the form of red, green, and blue emitting phosphor dots discretely arranged on the screen 25. The electron gun or electron beam emitters 21 are spaced equidistantly from one another and are usually mounted to provide static convergence of the respective electron beams at the central mask or grid opening. As a specific example, these electron guns 21 individually emit a beam of electrons 23, all of which converge at an aperture 35 in mask 27 and cross one another to impinge upon the associated color emitting phosphor dots 39 formed on viewing panel 41. The three electron guns 43, 45, and 47 are oriented to provide electron beams 43', 45' and 47' to the red, green and blue color emitting phosphor dots respectively.

Blue and red phosphors which are compatible with the green phosphor of the invention are any known or unknown cathodoluminescent phosphors having $x$ and $y$ coordinates for tri-color cathode ray tubes within the following ranges:

|  | x | y |
|---|---|---|
| red: | 0.625 to 0.645 | 0.325 to 0.345 |
| blue: | 0.145 to 0.160 | 0.045 to 0.070 |

Suitable red phosphors would include, for example, the europium activated yttrium oxide and yttrium oxysulfide phosphors presently used commercially in tri-color tubes, and suitable blue phosphors would include zinc sulfide activated with silver and aluminum presently used commercially. Some other red and blue phosphors having $x$ and $y$ coordinates within the above ranges and otherwise suitable for use in tri-color television tubes are well known and are not a necessary part of this description.

EXAMPLE II

Two sets of tri-dot color cathode ray tubes of the type depicted in FIGS. 1 and 2 were fabricated, a first or "control" set of 5 tubes containing a standard ZnCdS: Cu, Al green phosphor having $x$ and $y$ coordinates of 0.3254 and 0.5749 respectively and the second set of 4 tubes containing a green phosphor of the invention having $x$ and $y$ coordinates of 0.2656 and 0.5638 respectively. Both sets of tubes contained standard $Y_2O_3$: Eu red and ZnS: Ag, Al blue phosphors. Both the color field brightnesses and the white brightness of each tube were measured for a color temperature of 9300° K. Average values of brightness and electron gun current ratios are presented below in Table I.

TABLE I

|  | Control | No-Cd Green Set |
|---|---|---|
| Brightness (foot lamberts) | | |
| Red | 16.46 | 15.85 |
| Green | 50.10 | 48.07 |
| Blue | 10.42 | 10.32 |
| White | 36.04 | 32.58 |
| Current Ratios | | |
| Red:Green | 0.59 | 0.95 |
| Red:Blue | 0.95 | 1.56 |
| Blue:Green | 0.62 | 0.61 |

The values for the tubes containing the no-cadmium green phosphor represent acceptable levels of brightness and gun current ratios, indicating that commercially useful tri-dot tubes may be fabricated using the phosphor of the invention.

While there has been shown and described what are at present considered the preferred embodiments of the invention, it will be obvious to those skilled in the art that various changes and modifications may be made therein without departing from the scope of the invention as defined by the appended claims.

What is claimed is:

1. A tri color cathode ray tube having at least one electron gun from which electrons are beamed to and impinged upon a cathodoluminescent screen supported by a screen supporting surface, the screen comprising: blue, green and red emitting phosphors disposed on the surface in discretely patterned groups: the green phosphor consisting essentially of zinc sulfide activated by from 10 to 200 parts per million of copper and coactivated by from 20 to 600 parts per million of aluminum and containing less than 50 parts per million of halogen, and exhibiting cathodoluminescent emissions having $x$ and $y$ coordinates within the range of 0.250 to 0.280 and 0.560 to 0.615 respectively; the blue phosphor consisting essentially of zinc sulfide coactivated with silver and aluminum, and exhibiting cathodoluminescent emissions having $x$ and $y$ coordinates within the range of 0.145 to 0.160 and 0.045 to 0.070 respectively; and the red emitting phosphor selected from the group consisting of europium activated yttrium oxide and europium activated yttrium oxysulfide, and exhibiting cathodoluminescent emissions having $x$ and $y$ coordinates within the range of 0.625 to 0.645 and 0.325 to 0.345 respectively, whereby the beam impingement stimulates cathodoluminescent emissions from the respective green, blue and red phosphors.

2. The color cathode ray tube of claim 1 wherein said green emitting material contains from 50 to 150 parts per million of copper and 100 to 400 parts per million of aluminum.

3. The color cathode ray tube of claim 1 wherein the $x$ and $y$ coordinates of the green emitting phosphors are within the range of 0.270 to 0.280 and 0.590 to 0.600 respectively.

* * * * *